(12) United States Patent
Ogasawara

(10) Patent No.: US 8,239,871 B2
(45) Date of Patent: Aug. 7, 2012

(54) MANAGING TIMEOUT IN A MULTITHREADED SYSTEM BY INSTANTIATING A TIMER OBJECT HAVING SCHEDULED EXPIRATION TIME AND SET OF TIMEOUT HANDLING INFORMATION

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/144,780

(22) Filed: Jun. 24, 2008

(65) Prior Publication Data

US 2009/0320030 A1   Dec. 24, 2009

(51) Int. Cl.
*G06F 9/46* (2006.01)
*G06F 11/00* (2006.01)

(52) U.S. Cl. ............... 718/102; 718/101; 714/38.12

(58) Field of Classification Search .......... 718/102
See application file for complete search history.

(56) References Cited

U.S. PATENT DOCUMENTS

| | | | |
|---|---|---|---|
| 5,491,815 A * | 2/1996 | Basso et al. | 713/502 |
| 5,838,957 A * | 11/1998 | Rajaraman et al. | 713/502 |
| 6,163,506 A * | 12/2000 | Mundy | 368/10 |
| 6,493,741 B1 * | 12/2002 | Emer et al. | 718/107 |
| 7,702,957 B2 * | 4/2010 | Shinn et al. | 714/38.1 |
| 7,984,444 B1 * | 7/2011 | Shavit et al. | 718/102 |
| 2008/0013450 A1 * | 1/2008 | Worley et al. | 370/230 |
| 2008/0301484 A1 * | 12/2008 | Abe | 713/502 |

* cited by examiner

*Primary Examiner* — Jennifer To
*Assistant Examiner* — Kevin X Lu
(74) *Attorney, Agent, or Firm* — Cantor Colburn LLP; Vazken Alexanian

(57) ABSTRACT

A method of managing a multithreaded computer system comprises instantiating, in response to each transaction initiated by a first thread of a plurality of threads, a timer object including a scheduled expiration time and a set of timeout handling information for the transaction in storage local to the first thread; registering, in response to each passing of a fixed time interval, each timer object in the storage local to the first thread for which the scheduled expiration time is earlier than the fixed time interval added to a current time in a timer processing component by adding a pointer referencing the timer object to a data structure managed by the timer processing component; and managing each timer object corresponding to a transaction initiated by the first thread that is not registered in the timer processing component in the storage local to the first thread. The timer processing component regularly processes each timer object referenced by the data structure for which the scheduled expiration time value is not earlier than the current time in accordance with the set of timeout handling information of the timer object.

12 Claims, 5 Drawing Sheets

MANAGING TIMEOUT IN A MULTITHREADED SYSTEM BY INSTANTIATING A TIMER OBJECT HAVING SCHEDULED EXPIRATION TIME AND SET OF TIMEOUT HANDLING INFORMATION

BACKGROUND OF THE INVENTION

1. Field of the Invention

Exemplary embodiments of the present invention relate to management of timeouts for transactions, and more particularly, to management of timeouts for transactions initiated by threads on shared-memory multiprocessor systems.

2. Description of Background

Multiprocessor or multi-core systems contain multiple processors (also referred to herein as CPUs) within a single machine that can execute multiple processes, or multiple threads within a single process, simultaneously in a manner known as parallel computing. Parallel computing operates on the principle that larger problems can often be divided into smaller ones that may be solved concurrently. In general, because different threads and processes can be carried out literally simultaneously on different processors, multiprocessor systems execute multiple processes or threads faster than conventional single processor systems such as personal computers that execute programs sequentially. Shared memory multiprocessor systems offer a common physical memory address space that all processors can access. Multiple processes therein, or multiple threads within a process, can communicate through shared variables in memory which allow the processes to read or write to the same memory location in the computer system.

It is expected that, as shared memory multiprocessor systems continue to develop, the number of processors (and thus, the number of hardware threads that can concurrently execute) will continue to increase. Nevertheless, the increase in the number of threads that may be executed simultaneously creates problems with synchronizing data shared among the threads. Thus, the degree to which processes can be executed in parallel depends, in part, on the extent to which they compete for exclusive access to shared memory resources, as threads may attempt to access the same resources at the same time in a manner that is difficult to manage efficiently. In multithreading computer systems, particularly those that include multi-core processors or multiple processors, it is often necessary for concurrently executing processes to arbitrate entry into a critical section of a program. This is often because a program executing in the critical section is accessing a resource that may only be accessed exclusively and must exclude all other programs from simultaneous access. Therefore, careful control of the variables that are modified inside and outside the critical section is required.

Typically, each thread uses the programming construct of a lock at the entry and exit of a critical section to ensure exclusive use and enable synchronization. A lock allows one thread to take control of a shared resource and prevent other threads from reading or writing it until that resource is unlocked. One thread will successfully lock the shared resource, while other threads will be blocked—that is, waiting in idle status until the variable or shared resource is unlocked again. The thread holding the lock is free to execute the critical section, and to unlock the data when it is finished.

Lock-based resource protection causes substantial synchronization issues that utilize system resources and can greatly degrade system scalability and relative efficiency. The cost of using locks is the overhead of lock operations incurred on each thread (for example, the memory space allocated for locks, the processor time to initialize and destroy locks, and the time for acquiring or releasing locks) and the decrease in scalability due to lock contentions among threads (that is, where threads attempt to acquire locks held by other threads). Because only one thread can enter its critical section when locks compete, lock contention poses a significant limit on the maximum useful number of processors in a system. Furthermore, the more locks being used, the more overhead associated with the usage. Compared to non-lock operations, lock operations, such as compare-and-swap and memory serialization, are slow, typically requiring tens or hundreds of clock cycles on typical processors. Thus, even in situations where lock contention does not occur, lock operations will incur a high number of processor cycles.

SUMMARY OF THE INVENTION

The shortcomings of the prior art can be overcome and additional advantages can be provided through exemplary embodiments of the present invention that are related to a method of managing a multithreaded computer system. The method comprises instantiating, in response to each transaction initiated by a first thread of a plurality of threads, a timer object including a scheduled expiration time and a set of timeout handling information for the transaction in storage local to the first thread; registering, in response to each passing of a fixed time interval, each timer object in the storage local to the first thread for which the scheduled expiration time is earlier than the fixed time interval added to a current time in a timer processing component by adding a pointer referencing the timer object to a data structure managed by the timer processing component; and managing each timer object corresponding to a transaction initiated by the first thread that is not registered in the timer processing component in the storage local to the first thread. The timer processing component regularly processes each timer object referenced by the data structure for which the scheduled expiration time value is not earlier than the current time in accordance with the set of timeout handling information of the timer object.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented on a multithreading computer system to provide a mechanism for performing management of timer objects for transactions executed by threads in a manner that eliminates the need for threads to use lock mechanisms to block access to timer processing resources during processing of critical sections. Exemplary embodiments can be implemented to recognize the current expiration probability for transactions being executed by each thread and to provide for registration and processing of the timer objects for each transaction with low expiration probability in a storage area locally managed by thread executing the transaction.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

Figure 1:
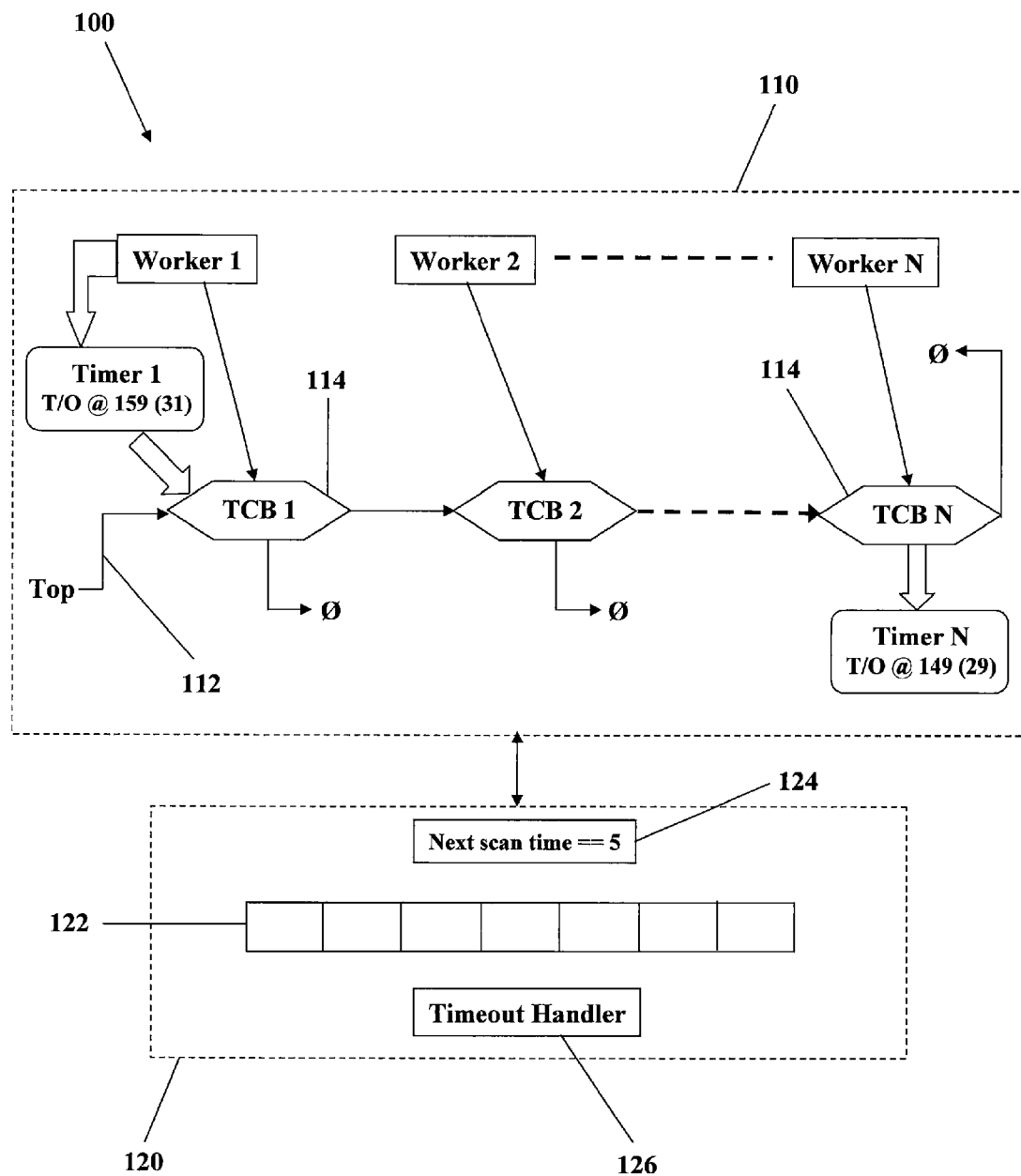
FIG. 1 is a block diagram illustrating an exemplary embodiment of a timer management mechanism for implementation on a shared-memory multithreading computer system in accordance with the present invention, depicting during an example state of operation for the timer management mechanism.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented on a multithreading computer system that may include one or more processors coupled to a bus. Alternatively, the system may have a processor that is a multi-core processor, or in other instances, multiple multi-core processors. In exemplary embodiments in which the system includes multiple processors or a multi-core processor, processing is divided into multiple threads, each with its own hardware processor state, within a single-software defined process or within multiple processes. In exemplary embodiments, the system may include a processor that is hyper-threaded, or able to perform in a manner as if it were a multi-core processor despite having only a single core.

In exemplary embodiments, the multithreading computer system can include a shared transactional memory and support a set of transactional operations that include an operation to initiate a transaction, an instruction to terminate a transaction normally, an instruction to abort a transaction. Transactional processing, in which sequences of concurrent operations are combined into atomic transactions, is implemented to maintain the system in a consistent state by ensuring that any interdependent operations carried out on the system are either all completed successfully or canceled successfully. That is, each transaction must succeed or fail as a complete unit. Every thread completes its modifications to shared memory without regard to the activities of the other threads, and changes to shared memory for an entire transaction are validated and committed if other threads have not concurrently made changes. Where the processing time for an executing transaction exceeds a scheduled timeout or expiration time, the transaction will be aborted, which causes all its prior changes, including the successfully ones, to be rolled back (that is, undone) in a timeout event. The scheduled expiration time for a transaction and the operations to be performed during a timeout event for the transaction can be maintained within a timer object instantiated for the transaction upon initiation of the transaction.

Exemplary embodiments of the present invention disclosed herein can be implemented on a multithreading computer system to provide a mechanism for performing management of timer objects for transactions executed by threads in a manner that eliminates the need for threads to use lock mechanisms to block access to timer processing resources during processing of critical sections. Exemplary embodiments can provide this lock-free ability by relying on the characteristic that timeout events for transactions resulting from timer expiration rarely occur. As will be described in greater detail below, exemplary embodiments can be implemented to recognize the current expiration probability for transactions being executed by each thread and to provide for registration and processing of the timer objects for each transaction with low expiration probability in a storage area locally managed by thread executing the transaction. As a result of the thread-local management of timer objects performed in exemplary embodiments, the use of locks that would otherwise be necessary for critical section management is no longer needed, and, therefore, the issues of the overhead of lock operations incurred on each thread and the decrease in the scalability of the number of system processors due to lock contentions among threads can be alleviated.

Referring now to FIG. 1, an exemplary embodiment of a timer management mechanism for implementation on a shared-memory multithreading computer system in accordance with the present invention, shown during an example state of operation for the timer management mechanism, is illustrated. Generally, timer management mechanism 100 is provided through interaction between a local timer management component 110 and a timer processing component 120. Local timer management component 110 includes a linked list data structure 112 for management of the timer object instantiated for each transaction initiated by a plurality of threads in a storage area that is local to the particular thread that initiated the transaction. As will be described in greater detail below, linked list 112 can contain a plurality of timer control block nodes 114, with each timer control block being unique to a particular thread. The timer control block in linked list 112 for each thread is configured to maintain a timer queue of timer objects instantiated by the thread for the transactions initiated by the thread. As will also be described in greater detail below, timer processing component 120 is configured to perform a periodic scan or traversal of timer control blocks 114 of linked list 112 at regular intervals. As depicted in FIG. 1, timer processing component 120 includes a data structure 122 for storing timer objects that have been registered within the timer processing component (for example, a binary heap in which timer objects are sorted according to scheduled expiration time) and a "next scan time" register 124 for storing the time at which the next regular scan operation by the timer processing component is scheduled to be conducted.

During operation of a multithreading system implementing timer management mechanism 100, when a thread initiates a transaction, that thread will create a timer object that includes the scheduled expiration time at which the timeout event for the transaction will take place. The timer object will also contain data corresponding to the exchanges to be performed during a timeout event (for example, the operations to be executed for restoring the system to the state before the transaction was initiated in the case that a rollback will be performed). As will be explained in greater detail below, in timer management mechanism 100, rather than timer processing component 120, each thread will manage the timer objects for each transaction that it initiates in a timer control block allocated for that thread in linked list 112 of local timer management component 110 as long as the expiration time at which timeout for the transaction is scheduled to take place is later than the time stored in register 124 when the next scan operation is scheduled to be conducted by timer processing component 120.

If timer processing component 120, while performing a regular scan of local timer management component 110, locates a timer object having an expiration time that would occur earlier than the next scan time stored in register 124 (that is, a timer object that expires after the current scan and before the next scan by timer processing component), the timer object is registered in timer processing component 120. If a thread deletes a timer object that it created for a transaction before the time it would be registered in timer processing component 120 during a scan operation, all timer management for that object will have been performed by the thread within the timer control block allocated for that thread in linked list 112 of local timer management component 110. In the example operating state of timer management mechanism 100 depicted in FIG. 1, with the present time being 0, a first thread, Worker 1, is adding a first timer object, Timer 1, while a second thread, Worker N, is deleting a second timer object, Timer N, at the same time. The details of the timer objects, timer control blocks 114, and their management within timer management mechanism 100 will be described in greater detail below.

Because timeouts for transactions only result from abnormalities in processing, the scheduled expiration time for transactions is rarely approached. As a result, registration of timer objects in timer management mechanism 100 is divided into two cases: (1) initial registration of timer objects within local timer management component 110 in storage local to the thread initiating the corresponding transaction, and (2) registration of timer objects that have an expiration time that would occur later than the next scan time by timer management mechanism 100 in the timer processing system.

In the present exemplary embodiment, the periodic time interval at which timer processing component 120 performs the scan of timer control blocks 114 in linked list 112 is configured to ensure that nearly all timer objects are processed within thread-local storage local timer management component 110. By setting the threshold time period for this division to be much smaller than the typical expiration time at which timeout is scheduled to take place, almost all timer processing for each thread can be managed in the local storage region allocated for the thread within local timer management component 110. In the example operating state depicted in FIG. 1, the value stored in next scan time register 124 of timer processing component 120 is 5 seconds. Thus, if a failure occurs in thread Worker N that would cause the deletion of Timer N to be deferred to the scheduled expiration time for Timer N (149 seconds after the present time), Timer N will be registered in timer processing component 120 145 seconds after the present time (that is, when the 29th scan operation after the present time is conducted by the timer processing component). This is because timer processing component 120, during the scan of the timer objects in local timer management component 110 performed at this later time, will recognize that the timeout for Timer N will occur before the next periodic scan operation will be performed.

When registering timer objects that are found while performing a scan operation, timer processing component 120 will not delete the timer objects for which the scheduled expiration time will occur before the next periodic scan operation from local timer management component 110. Rather, timer processing component 120 simply stores, in data structure 122, a pointer referencing the timer object within linked list 112. As a result, the actual timer object for each transaction initiated by a thread will be maintained, during processing of the transaction, in the timer control block specific to that thread in local timer management component 110, thereby alleviating the need for exclusive control of timer processing component 120 among threads and expensive lock operations such as compare-and-swap during execution of critical sections. Timer object registration and deletion can be performed simply by using the load or store instructions provided by the architecture of the computer system, and timer processing component 120 is able to continually perform timer expiration processing and the regular scan of the timer objects in local timer management component 110 without being locked out by executing threads. As a result, the issues of the overhead of atomic lock operations incurred on each thread and the decrease in the scalability that result from lock contentions among threads can be alleviated.

For timer objects that do eventually become registered within timer processing component 120, the timer processing component is configured to perform the timer expiration processing of the timer objects that it does register in a conventional manner. For this purpose, timer processing component 120 includes a timeout handler module 126 that regularly performs a scan or traversal of the timer objects referenced by the pointers within data structure 122, processes the timer objects that have already expired, and then deletes the reference to each expired timer object from the data structure.

The timer objects created by threads for registration in exemplary timer management mechanism 100, such as Timer 1 and Timer N in the example depicted in FIG. 1, as well as their storage and management within the mechanism, will now be described in greater detail. In exemplary embodiments, in addition to conventional variables such as the scheduled expiration time for a transaction and the operations to be executed upon occurrence of a timeout, a timer object, Timer T, created by a thread when the thread initiates the transaction will include the additional values of a window counter C and a deleted flag D. Window counter C is an integer variable that is initialized by the thread that registers Timer T and stores the number of periodic scans that will be performed by timer processing component 120 between the present time and the scheduled expiration time for the transaction for Timer T. In the example operating state depicted in FIG. 1, the value of window counter C for each timer object is indicated in parentheses for the respective timer object—for example, the value of window counter C for Timer 1 is 31 (indicating that 31 scans will be performed by timer processing component 120 between the present time and the scheduled expiration time for Timer 1 159 seconds later), and the value of window counter C for Timer N is 29 (indicating that 29 scans will be performed by timer processing component 120 between the present time and the scheduled expiration time for Timer N 149 seconds later).

For each timer object registered within local timer management component 110, window counter C is decremented by timer processing component 120 by 1 after each scan operation is performed unless the value of window counter C has already been decremented to 0, in which case Timer T will be registered by the timer processing component in data structure 122. Deleted flag D is a Boolean variable that indicates whether Timer T has already been released to help in decreasing the workload of the timer processing system. In alternative exemplary embodiments in which Timer T does not include deleted flag D, timer management mechanism 100 will still operate normally.

In the exemplary embodiment illustrated in FIG. 1, to provide for thread-local storage and management of timer objects, local timer management component 110 maintains and manages linked list 112 providing for a list of timer control blocks 114. The structure of linked list 112 is modified each time a thread registers its unique timer control block with the list. Each timer control block is unique to and managed by a particular thread, and includes a timer queue where each timer object created by that thread for transactions initiated by the thread is placed when registered in local timer management mechanism 110. Each timer control block in linked list 112 provides a reference pointing to the next timer control block (or a null value if it is the final timer control block in the linked list). Typically, each time a thread initiates a transaction in timer processing system, the thread creates and places a timer object in the timer queue of its respective timer control block of linked list 112.

To perform the periodic scan of timer objects, timer processing component 120 accesses the linked list of timer control blocks in linked list 112 to traverse the timer objects registered in local timer management component 110 by tracing the list of pointers that reference the timer control blocks. Each thread can also reference the timer objects placed in the timer control blocks by tracing the pointers that constitute the links between timer control blocks. While each thread can access each time object placed on a respective timer control block of linked list 112, a timer object can only be modified (that is, registered within local timer management component 110, deleted, or otherwise modified) by the particular thread that created the timer object and registered the timer object in the timer control block for that thread. In performing these operations, mutual exclusion among both threads and timer processing mechanism 120 is not required.

Figure 2:
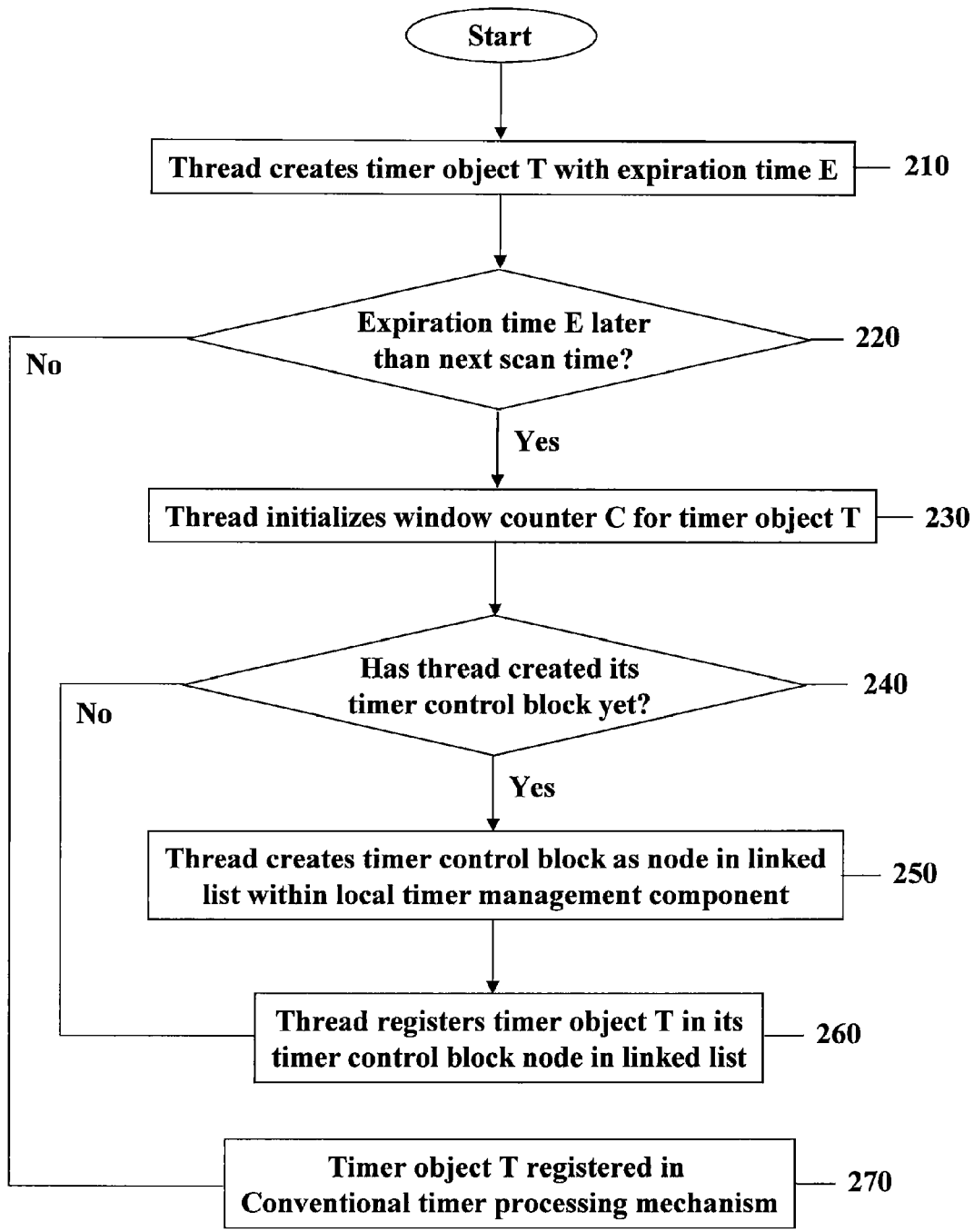
FIG. 2 is a flow diagram illustrating an exemplary embodiment of a process for registration and management of a timer object within the exemplary timer processing mechanism of FIG. 1 in accordance with the present invention.

Referring now to FIG. 2, a flow diagram illustrating an exemplary embodiment of a process for registration and management of a timer object within timer management mechanism 100 is provided. In exemplary process 200, at block 210, a thread initiating a transaction creates a timer object having an expiration time scheduled to occur at time E. At decision block 220, the thread accesses next scan time register 124 of timer processing component 120 and compares the value of time E with the value stored in register 124.

If the expiration time for the timer object is scheduled to occur before the next scan operation to be performed by timer processing component 120, exemplary process 200 proceeds to block 270, at which point the timer object is registered in the timer processing component, as described above. Otherwise, if it is determined at decision block 220 that the expiration time for the timer object is not scheduled to occur prior to the next scan operation performed by timer processing component 120, the process proceeds to block 230, at which the thread registering the timer object initializes the window counter C of the timer object. The thread will set value of window counter C at block 230 to be the equivalent of the scheduled expiration time E divided by the regular time interval I between the periodic scans performed by timer processing component 120 (rounded down to the nearest integer). After the value of window counter C is set at block 230, exemplary process 200 proceeds to block 240.

At decision block 240, the thread, which is registering the timer object, determines whether it has already created and placed its unique timer control block in the linked list provided by linked list 112. If the thread determines that it has already created its timer control block, exemplary process 200 proceeds from decision block 240 to block 250. Otherwise, exemplary process 200 proceeds from decision block 240 to block 260.

If the thread determines that it has not already added a timer control block to linked list 112, the thread registering the timer object, at block 250, creates a respective timer control block and atomically adds it as a node in linked list 112. Once a thread adds its respective timer control block to linked list 112, it will not need to perform this operation again. To add its timer control block to linked list 112, the thread can utilize any suitable non-blocking list operation for adding a node to a linked list data structure. For example, each time a thread adds a timer control to linked list 112, the timer control block can be added to the top of the linked list by executing the following sequence of operations: (1) setting the next node pointer of the new timer control block to reference to the first node in the linked list (that is, setting the next node pointer of the new timer control block to match the pointer to the top of the linked list), (2) performing a compare-and-swap operation that atomically compares the contents of the memory location referenced by the pointer to the top of the linked list to compares the contents of the memory location referenced by the next node pointer of the new timer control block, (3) if they are the same, modifying the memory location referenced by the pointer to the top of the linked list to the memory location of the new timer control block, and (4) indicating whether the modification was performed (this can be done with a simple Boolean response). The sequence of operations repeated until the response indicates that the modification was performed.

As will be described in greater detail below, the thread can add the timer control block to linked list 112 without requiring exclusive control of the data structure (that is, another thread will be able to concurrently scan the linked list of timer control blocks while a timer control block is being added to the list), and, upon the addition of the timer control block added by the thread, timer processing component 120 can perform the periodic scan of the linked list data structure of timer control blocks without encountering any failure in the links referencing the timer control blocks in the list. Following placement of the timer control block in linked list 112 by the thread, exemplary process 200 proceeds from block 250 to block 260.

At block 260, the thread registers the timer object created at block 210 in local timer management mechanism 110 by storing the timer object in the respective timer control block for that timer in linked list 112. Because the thread that placed this timer control block in linked list 112 is the only thread that can modify the timer object data of the node, the timer object registration performed at block 260 can be performed using an atomic load or store instruction (for example, the pointer referencing the timer object can be atomically substituted for the pointer that references the top of the linked list with the store instruction). At this point, registration of timer object is complete, and timer processing component 120 will be able to perform the periodic scan of the linked list of timer control blocks in linked list 112 without encountering any failure in the links referencing the timer control blocks in the list.

In exemplary embodiments implementing the process just described, the mechanism by which a thread can add the timer control block to linked list 112 at block 250 while allowing for another thread to concurrently scan the linked list of timer control blocks can be implemented in local timer management component 110 in a manner that is similar to the read-copy-update (RCU) operating system kernel technology. In particular, RCU is a synchronization mechanism that is sometimes used as an alternative to a readers-writer lock and allows for extremely low overhead and wait-free reads. The basic idea behind RCU is to split updates into "removal" and "reclamation" phases. The removal phase removes references to data items within a data structure (possibly by replacing them with references to new versions of these data items), and can run concurrently with readers. It is safe to run the removal phase concurrently with readers in this fashion because the semantics of modern processing units will guarantee that readers see either the old or the new version of the data structure, rather than a partially updated reference. The reclamation phase does the work of reclaiming (that is, freeing) the data items removed from the data structure during the removal phase. Because reclaiming data items can disrupt any readers concurrently referencing those data items, the reclamation phase must not start until readers no longer hold references to those data items.

In a manner analogous to the RCU just described, the mechanism implemented by local timer management component 110 that allows a thread to continue executing a scan the linked list of timer control blocks in linked list 112 while another thread is adding its timer control block to the linked list at block 250 is implemented by the following sequence of operations: (1) upon initiating the addition of the timer control block, the thread adding the timer control block temporarily disables the pointer that references the top of the linked list so that any other threads cannot gain reference to the linked list; (2) the thread that is performing the scan operation completes the traversal of the linked list of timer control blocks; and (3) upon completing the scan, the scanning thread frees the pointer that references the top of the linked list that was disabled at the first operation to once again allow other threads to gain reference to the linked list. By splitting the update of linked list 112 into node addition and reclamation phases, a thread is able to place its timer control block onto the linked list immediately, while the reclamation operation is delayed until all other threads actively scanning the linked list when the update is initiated have completed their scans, either by blocking until the scans are finished or by registering a rollback that is invoked after they finish. Only threads that are actively scanning the linked list when the addition of a timer control block is initiated need to be considered, because any thread initiating a scan after the addition operation is initiated will be unable to gain a reference to the removed data items, and therefore cannot be disrupted by the reclamation phase.

The implementation of this mechanism within local timer management component 110 allows the use of much lighter-weight synchronization techniques, and, in some instances, absolutely no synchronization at all, as opposed to conventional lock-based schemes that would require heavy-weight synchronization to prevent the thread that is adding its timer control block from causing failure in the pointers referencing the timer control blocks in the list. This allows for atomic insertion of a timer control block in linked list linked list 112 without disrupting scans being performed by other threads. While a first thread is adding its timer control block to linked list 112, a second thread that is concurrently traversing the linked list can continue accessing linked list 112 in the state in which the data structure existed prior to the addition of the timer control block by the first thread without the incurring the cost of lock overhead or causing a decrease in scalability of shared memory multiprocessor systems that would otherwise result due to lock contention.

Figure 3:
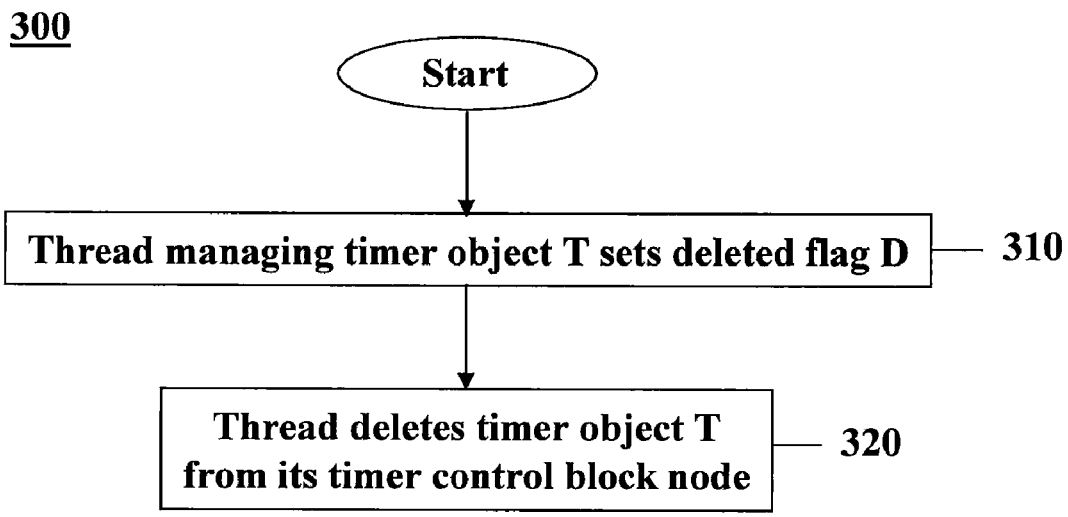
FIG. 3 is a flow diagram illustrating an exemplary embodiment of a process for deletion of a timer object within the exemplary timer processing mechanism of FIG. 1 in accordance with the present invention.

Referring now to FIG. 3, a flow diagram illustrating an exemplary embodiment of a process for deletion of a timer object that has been registered within timer management mechanism 100 is provided. In exemplary process 300, at block 310, the thread that created and manages the timer object to be deleted sets the deleted flag D for the timer object (the deleted flag D is cleared with the timer object is instantiated). Thus, if timer processing component 120 later registers this timer object in data structure 122 while performing a regular scan of the timer control blocks in linked list 112, when the timer object expires at the scheduled expiration time, the timer processing component will recognize that the deleted flag is set and can thereby determine whether it is necessary to perform expiration processing. After setting the deleted flag D for the timer object, the managing thread, at block 320, then deletes the timer object data from its timer control block in linked list 112. Because only this thread can modify its timer control block, the timer object can be atomically deleted from the timer control block with a load or store instruction. When timer processing component 120 performs a regular scan of the linked list 112, the scan operation can be performed without any failure in the linkage of the timer control blocks to the list. After the timer object is deleted at block 320, the deletion of the timer object is complete.

Figure 4:
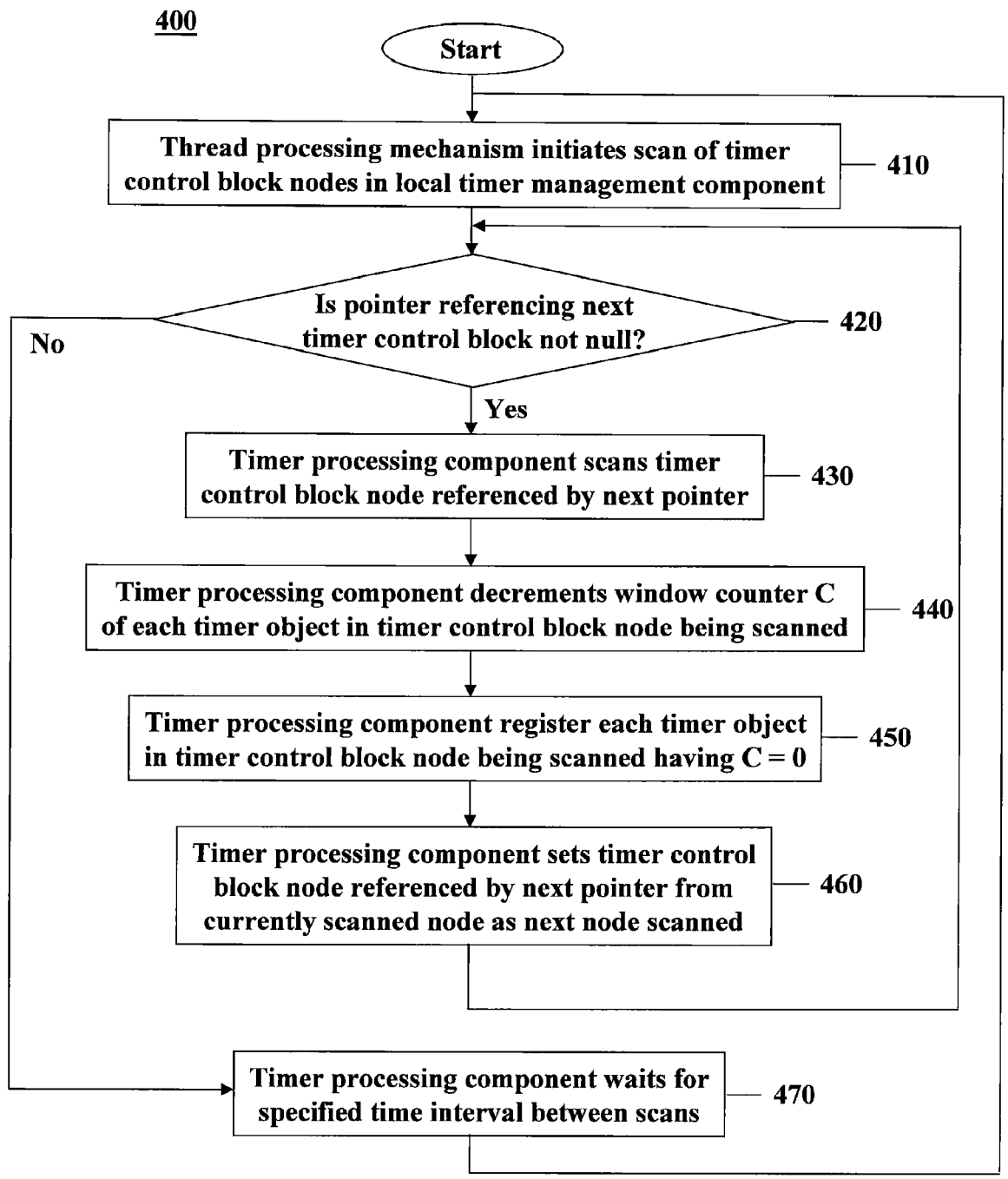
FIG. 4 is a flow diagram illustrating an exemplary embodiment of a process implemented within the exemplary timer processing mechanism of FIG. 1 for periodically scanning timer objects in accordance with the present invention.

Referring now to FIG. 4, a flow diagram illustrating an exemplary embodiment of a process implemented within timer management mechanism 100 by timer management mechanism 110 for periodically scanning the timer control blocks within linked list 112 for timer objects having a scheduled expiration time that is later than the time stored in next scan time register 124 is provided. In exemplary process 400, at block 410, timer processing component 120 initiates a periodic scan of the linked list of timer control blocks in linked list 112. For each periodic scan, timer processing component 120 sequentially traverses timer control blocks 114 of linked list 112 in order from the top of the linked list to a null pointer indicating the end of the list. Thus, upon initiating each scan, timer processing component 120 initially sets the pointer to the top of the linked list 112 as the reference to the next timer control block to be scanned.

Upon initiating the scan at block 410, timer processing component 120 also sets the value of next scan time register 124 to the time that is equivalent to the current time added to the threshold time interval between scans. In exemplary embodiments, the length of the regular time interval between each periodic scan operation by timer processing mechanism 120 can be determined, for example, during application parameter configuration or experimentally. By setting this threshold time period to be much smaller than the expiration time at which timeout is typically scheduled to take place, almost all timer processing for each thread can be managed in the local storage region allocated for the thread within local timer management component 110.

In exemplary process 400, timer processing component 120, at decision block 420, determines whether the pointer referencing the next timer control block to be scanned in linked list 112 is null. If the pointer is null, process 400 proceeds to block 470, at which timer processing component 120 waits for the threshold time interval to pass, after which process 400 returns to block 410 to perform the next periodic scan. If, at decision block 420, the pointer referencing the next timer control block to be sequentially scanned is not null, process 400 proceeds to block 430, at which timer processing component 120 begins scanning the timer control block referenced by this pointer by traversing the list of timer objects in the timer control block. At block 440, for each timer object in the list, decreases the value of the window counter C variable in that timer object by one. Process 400 then proceeds from block 440 to block 450.

At block 450, for each timer object stored in the timer control block currently being scanned, timer processing component 120 determines whether the window counter C has a value of zero (indicating that the expiration time scheduled for that timer object will occur before the next scan operation is performed). For each timer object in the timer control block currently being scanned having a window counter C value of zero, timer processing component 120 registers the timer object in data structure 122. To eliminate the need for mutual exclusion of timer processing component 120 among threads, when a timer object is registered in the timer processing component, the timer processing component simply stores, in data structure 122, a reference to the timer object stored in the thread-local storage. At block 460, timer processing component 120 sets the reference to the next timer control block to be scanned as the pointer from timer control block currently being scanned, after which the process returns to decision block 420.

In exemplary embodiments, timeout handler 126 of timer processing component 120 performs timeout processing of timer objects registered within data structure 122 in the conventional fashion. When a deleted flag D of such a timer object that has expired has been set, the timer object is no longer valid. Timer handler 126 can recognize this and, therefore, will not perform timeout processing for the timer object. Thus, the setting of a deleted flag D in this fashion helps reduce the workload of timer management mechanism 100. So as to not sacrifice performance, timeout handler 126 is designed to operate in parallel with, rather than in synchronization with, a transaction thread (for example, the timeout handler rewrites the variables of a time object, and a thread is able to read these rewritten variables). Therefore, even in very critical timing situations in which timeout handler 126 sees that the deleted flag D for a timer is cleared immediately before the deleted flag D is set, the timeout processing performed by the timeout handler does not cause any problem.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. As used herein, the term "program modules" includes routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of the machine embodying exemplary embodiments of a timer processing system in accordance with the present invention. Aspects of the modules may be written in a variety of programming languages, such as C, C++, Java, etc. The functionality provided by the modules described with reference to exemplary embodiments described herein can be combined and/or further partitioned.

Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
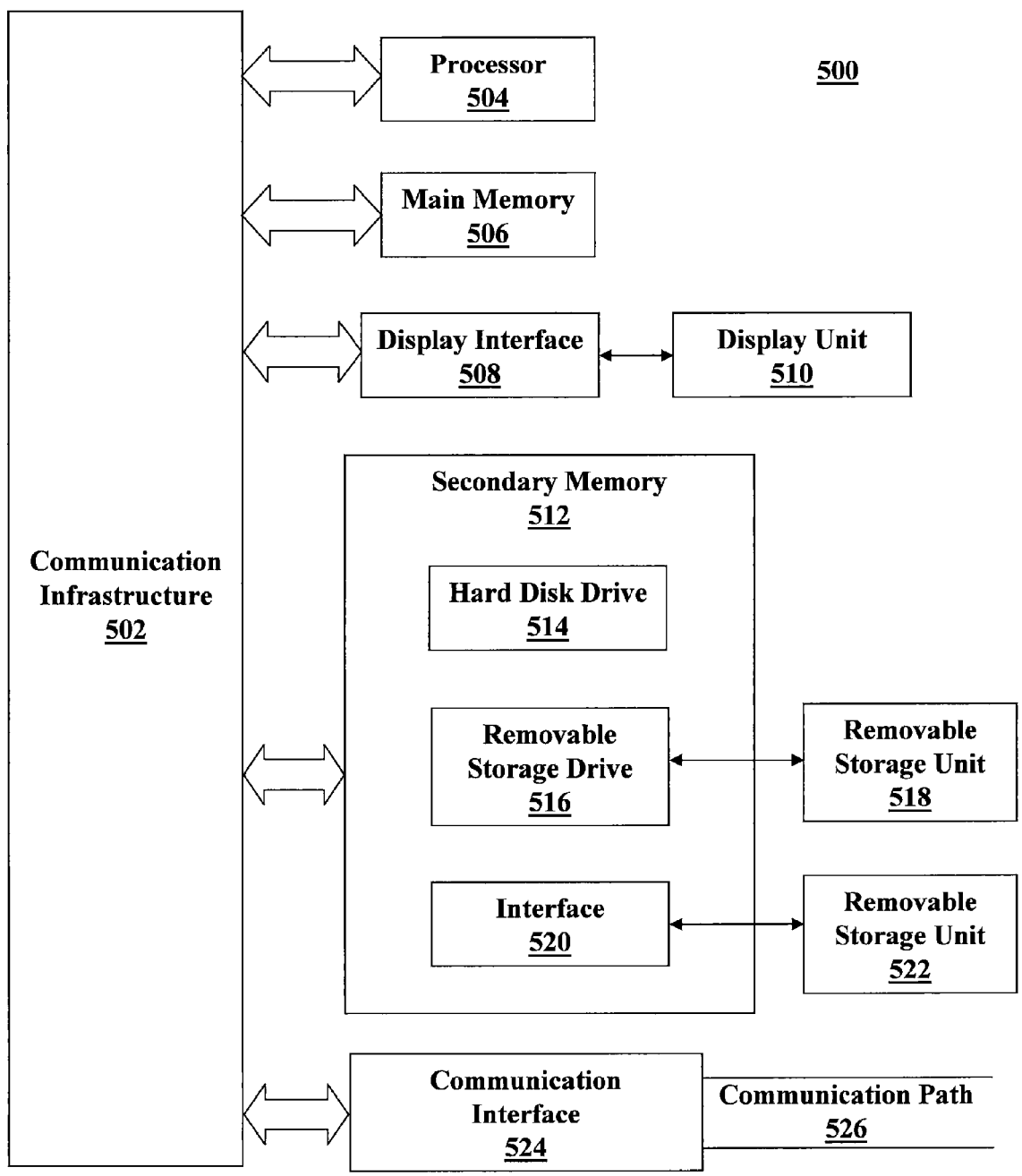
FIG. 5 is a block diagram illustrating an exemplary computer system that can be used for implementing exemplary embodiments of the present invention.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

Exemplary embodiments of computer system 500 can further include a transactional memory for sharing stored resources and mediating shared resource accesses among different requesting threads or processes. Variations on the specific architectural components of computer system 500 may include the inclusion of the transactional memory as a component of a processor or processors of the system in some instances; in alternative, the transactional memory may be a separate component on a bus connected to the processor or processors.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, it should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method of managing a timer processing system of a multithreaded computer system, the method comprising:

in response to each transaction initiated by a first thread of a plurality of threads, instantiating a timer object corresponding to the transaction in storage local to the first thread, the timer object including a scheduled expiration time and a set of timeout handling information for the transaction;

in response to each passing of a fixed time interval, registering each timer object instantiated in the storage local to the first thread for which the scheduled expiration time is earlier than the fixed time interval added to a current time in a timer processing system by adding a pointer that references the timer object to a data structure managed by the timer processing system, with a timer processing component regularly processing each timer object referenced by the data structure for which the scheduled expiration time value is not earlier than the current time in accordance with the set of timeout handling information of the timer object;

managing each timer object corresponding to a transaction initiated by the first thread that is not registered in the timer processing system in the storage local to the first thread;

for each transaction initiated by the first thread, in response to instantiating the timer object corresponding to the transaction, registering the timer object in the timer processing system by adding a pointer referencing the timer object to a data structure managed by the timer processing system if the scheduled expiration time of the timer object is earlier than the fixed time interval added to the current time;

in response to instantiating a first timer object corresponding to a first transaction initiated by the first thread, if the scheduled expiration time of the first timer object is not earlier than the fixed time interval added to the current time, instantiating a first timer control block in the storage local to the first thread and inserting the first timer control block in a linked list of timer control blocks each corresponding to a respective thread of the plurality of threads, wherein each timer control block in the linked list includes a timer object queue for containing timer objects instantiated by the respective thread;

in response to instantiating the first timer object, adding the first timer object to the timer object queue of the first timer control block; and in response to inserting the first timer control block in the linked list, for each subsequent transaction initiated by the first thread, adding the timer object to the timer queue of the first timer control block if the scheduled expiration time of the timer object is not earlier than the fixed time interval added to the current time;

wherein the timer processing system updates a time value stored in a first register to correspond to the fixed time interval added to the current time each time the time value stored in the first register is equivalent to the current time, wherein the timer processing system, in response to each update of the time value stored in the first register, traverses the timer control blocks in the linked list to identify each timer object contained in the timer object queue for each timer control block for which the scheduled expiration time is earlier than the time value stored in the first register, and wherein registering each timer object in the storage local to the first thread for which the scheduled expiration time is earlier than the fixed time interval added to the current time in the timer processing system, in response to each passing of the fixed time interval, is performed by the timer processing system during the traversal of the timer control blocks in the linked list in response to each update of the time value stored in the first register.

2. The method of claim 1, wherein, for each transaction initiated by the first thread, the timer object corresponding to the transaction further includes a deleted flag set to false when the timer object is instantiated, and further comprising, for each transaction initiated by the first thread, setting the deleted flag of the timer object corresponding to the transaction to true in response to completion of the transaction if the timer object is not registered in the timer processing component and deleting the timer object if the timer object is not registered in the timer processing component.

3. The method of claim 2, wherein processing each timer object referenced by the data structure for which the scheduled expiration time value is not earlier than the current time in accordance with the set of timeout handling information of the timer object consists of removing the pointer referencing the timer object in the data structure if the deleted flag of the timer object is set to true.

4. The method of claim 1, wherein inserting the first timer control block in the linked list of timer control blocks is performed using a non-blocking operation.

5. The method of claim 4, wherein the non-blocking operation comprises performing a compare-and-swap operation that involves setting a next node pointer of the first timer control block to reference a second timer control block referenced by a pointer to a top of the linked list, atomically determining whether the second timer control block is referenced by the pointer to the top of the linked list, setting the pointer to the top the linked list to reference the first timer control block if the second timer control block is referenced by the pointer to the top of the linked list, and wherein the non-blocking further comprises repeating the compare-and-swap operation until the pointer to the top the linked list is set to reference the first timer control block.

6. The method of claim 1, wherein, in response to a read of the linked list of timer control blocks initiated by a second thread that is currently executing, inserting the first timer control block in the linked list of timer control blocks comprises disabling a pointer referencing a top of the linked list, waiting for the read of the linked list of timer control blocks to complete, and enabling the pointer referencing a top of the linked list in response to completion of the read of timer control blocks.

7. The method of claim 1, wherein the data structure managed by the timer processing system comprises a binary heap for storing pointers referenced by timer objects sorted according to the scheduled expiration times of the timer objects referenced by the pointers.

8. The method of claim 1, wherein, for each timer object processed by the timer processing component in accordance with the set of timeout handling information of the timer object, the timer processing component removes the pointer referencing the timer object in the data structure.

9. The method of claim 1, wherein the fixed time interval is predetermined according to the specifications of the multithreaded computer system to ensure that, for the majority of transactions initiated by the first thread, the transaction will complete before the scheduled expiration time of the timer object corresponding to the transaction becomes earlier than the fixed time interval added to the current time.

10. A non-transitory computer-usable medium having computer readable instructions stored thereon for execution by a processor to perform a method of managing a timer processing system of a multithreaded computer system, the method comprising:

in response to each transaction initiated by a first thread of a plurality of threads, instantiating a timer object corresponding to the transaction in storage local to the first thread, the timer object including a scheduled expiration time and a set of timeout handling information for the transaction;

in response to each passing of a fixed time interval, registering each timer object instantiated in the storage local to the first thread for which the scheduled expiration time is earlier than the fixed time interval added to a current time in a timer processing system by adding a pointer that references the timer object to a data structure managed by the timer processing system, with a timer processing component regularly processing each timer object referenced by the data structure for which the scheduled expiration time value is not earlier than the current time in accordance with the set of timeout handling information of the timer object;

managing each timer object corresponding to a transaction initiated by the first thread that is not registered in the timer processing system in the storage local to the first thread;

for each transaction initiated by the first thread, in response to instantiating the timer object corresponding to the transaction, registering the timer object in the timer processing system by adding a pointer referencing the timer object to a data structure managed by the timer processing system if the scheduled expiration time of the timer object is earlier than the fixed time interval added to the current time;

in response to instantiating a first timer object corresponding to a first transaction initiated by the first thread, if the scheduled expiration time of the first timer object is not earlier than the fixed time interval added to the current time, instantiating a first timer control block in the storage local to the first thread and inserting the first timer control block in a linked list of timer control blocks each corresponding to a respective thread of the plurality of threads, wherein each timer control block in the linked list includes a timer object queue for containing timer objects instantiated by the respective thread;

in response to instantiating the first timer object, adding the first timer object to the timer object queue of the first timer control block; and in response to inserting the first timer control block in the linked list for each subsequent transaction initiated by the first thread, adding the timer object to the timer queue of the first timer control block if the scheduled expiration time of the timer object is not earlier than the fixed time interval added to the current time;

wherein the timer processing system updates a time value stored in a first register to correspond to the fixed time interval added to the current time each time the time value stored in the first register is equivalent to the current time, wherein the timer processing system, in response to each update of the time value stored in the first register, traverses the timer control blocks in the linked list to identify each timer object contained in the timer object queue for each timer control block for which the scheduled expiration time is earlier than the time value stored in the first register, and wherein registering each timer object in the storage local to the first thread for which the scheduled expiration time is earlier than the fixed time interval added to the current time in the timer processing system, in response to each passing of the fixed time interval, is performed by the timer processing system during the traversal of the timer control blocks in the linked list in response to each update of the time value stored in the first register.

11. A data processing system comprising:

at least one processor;

a random access memory for storing data and programs for execution by the at least one processor; and computer readable instructions stored in the random access memory for execution by the at least one processor to perform a method of managing a timer processing system of a multithreaded computer system, the method comprising:

in response to each transaction initiated by a first thread of a plurality of threads, instantiating a timer object corresponding to the transaction in storage local to the first thread, the timer object including a scheduled expiration time and a set of timeout handling information for the transaction;

in response to each passing of a fixed time interval, registering each timer object instantiated in the storage local to the first thread for which the scheduled expiration time is earlier than the fixed time interval added to a current time in a timer processing system by adding a pointer that references the timer object to a data structure managed by the timer processing system, with a timer processing component regularly processing each timer object referenced by the data structure for which the scheduled expiration time value is not earlier than the current time in accordance with the set of timeout handling information of the timer object;

managing each timer object corresponding to a transaction initiated by the first thread that is not registered in the timer processing system in the storage local to the first thread;

for each transaction initiated by the first thread, in response to instantiating the timer object corresponding to the transaction, registering the timer object in the timer processing system by adding a pointer referencing the timer object to a data structure managed by the timer processing system if the scheduled expiration time of the timer object is earlier than the fixed time interval added to the current time;

in response to instantiating a first timer object corresponding to a first transaction initiated by the first thread, if the scheduled expiration time of the first timer object is not earlier than the fixed time interval added to the current time, instantiating a first timer control block in the storage local to the first thread and inserting the first timer control block in a linked list of timer control blocks each corresponding to a respective thread of the plurality of threads, wherein each timer control block in the linked list includes a timer object queue for containing timer objects instantiated by the respective thread;

in response to instantiating the first timer object, adding the first timer object to the timer object queue of the first timer control block; and in response to inserting the first timer control block in the linked list, for each subsequent transaction initiated by the first thread, adding the timer object to the timer queue of the first timer control block if the scheduled expiration time of the timer object is not earlier than the fixed time interval added to the current time;

wherein the timer processing system updates a time value stored in a first register to correspond to the fixed time interval added to the current time each time the time value stored in the first register is equivalent to the current time, wherein the timer processing system, in response to each update of the time value stored in the first register, traverses the timer control blocks in the linked list to identify each timer object contained in the timer object queue for each timer control block for which the scheduled expiration time is earlier than the time value stored in the first register, and wherein registering each timer object in the storage local to the first thread for which the scheduled expiration time is earlier than the fixed time interval added to the current time in the timer processing system, in response to each passing of the fixed time interval, is performed by the timer processing system during the traversal of the timer control blocks in the linked list in response to each update of the time value stored in the first register.

12. The data processing system of claim 11, wherein the at least one processor comprises multiple processors operatively coupled to the random access memory for shared access to the random access memory.

\* \* \* \* \*